(12) United States Patent
Pfeiffer

(10) Patent No.: US 7,077,968 B2
(45) Date of Patent: Jul. 18, 2006

(54) METHOD FOR CONTINUOUSLY FILTERING RAW BRINE FOR USE IN CHLOR-ALKALI ELECTROLYSIS

(75) Inventor: Martin Pfeiffer, Uznach (CH)

(73) Assignee: DRM, Dr. Mueller AG, Maennedorf (CH)

( * ) Notice: Subject to any disclaimer, the term of this patent is extended or adjusted under 35 U.S.C. 154(b) by 0 days.

(21) Appl. No.: 10/499,841

(22) PCT Filed: Feb. 24, 2003

(86) PCT No.: PCT/CH03/00137

§ 371 (c)(1),
(2), (4) Date: Jun. 22, 2004

(87) PCT Pub. No.: WO03/076045

PCT Pub. Date: Sep. 18, 2003

(65) Prior Publication Data

US 2005/0040117 A1    Feb. 24, 2005

(30) Foreign Application Priority Data

Mar. 8, 2002    (CH) ........................... 403/02

(51) Int. Cl.
B01D 37/02    (2006.01)
B01D 21/02    (2006.01)

(52) U.S. Cl. .............. 210/778; 210/800; 210/803; 210/804

(58) Field of Classification Search .......... 210/739, 210/767, 779, 790, 791, 797, 798, 800, 803, 210/804, 805, 806, 777, 778, 433.1
See application file for complete search history.

(56) References Cited

U.S. PATENT DOCUMENTS

| | | | | |
|---|---|---|---|---|
| 299,774 A | * | 6/1884 | Garrigues | 423/208 |
| 755,415 A | * | 3/1904 | Trantom | 423/192 |
| 1,520,920 A | * | 12/1924 | Yngve | 423/198 |
| 1,687,703 A | * | 10/1928 | Allen | 210/777 |
| 2,412,106 A | * | 12/1946 | Swartz | 423/499.4 |
| 2,433,601 A | * | 12/1947 | Comstock | 423/186 |
| 3,497,452 A | | 2/1970 | Arvanitakis | |
| 3,655,333 A | * | 4/1972 | Stenger et al. | 62/537 |
| 3,925,028 A | * | 12/1975 | Lozano | 23/298 |
| 3,980,536 A | * | 9/1976 | Braithwaite et al. | 205/405 |
| 4,004,988 A | * | 1/1977 | Mollard et al. | 205/503 |
| 4,046,865 A | * | 9/1977 | Schafer | 423/449.5 |

(Continued)

FOREIGN PATENT DOCUMENTS

DE    11 75 650 B    8/1964

*Primary Examiner*—Robert James Popovics
(74) *Attorney, Agent, or Firm*—Michael J. Striker

(57) ABSTRACT

The method of continuously processing raw brine with a solids content to obtain substantially solids-free pure brine (E) for use in chlor-alkali electrolysis. In this method the raw brine (A) is separated, by means of a decanter (1), into a clear brine (B) with a lower solids content and an underflow (C) with a higher solids content, and the entire clear brine (B) and a metered fraction of the underflow (C) are supplied to a backwash pressure filter (5), from which the substantially solids-free pure brine (E) and a thickened slurry (F) are separately removed. The metered fraction and the clear brine (B) are controlled so that a solids concentration at an inlet to the pressure filter is 5 to 10 times that of a solids concentration in the clear brine (B), which stabilizes operations and increases filtration output.

5 Claims, 1 Drawing Sheet

U.S. PATENT DOCUMENTS

| | | | |
|---|---|---|---|
| 4,060,465 A * | 11/1977 | Yokota et al. | 205/618 |
| 4,119,508 A * | 10/1978 | Yokota et al. | 205/618 |
| 4,341,752 A * | 7/1982 | Groenhof | 423/497 |
| 4,443,346 A | 4/1984 | Mueller | |
| 4,522,728 A * | 6/1985 | Gallup et al. | 210/714 |
| 4,615,808 A * | 10/1986 | Gallup et al. | 210/714 |
| 4,634,533 A * | 1/1987 | Somerville et al. | 210/722 |
| 4,728,438 A * | 3/1988 | Featherstone et al. | 210/713 |
| 4,747,957 A * | 5/1988 | Vaughn et al. | 210/687 |
| 4,765,912 A * | 8/1988 | Totten | 210/713 |
| 4,818,773 A * | 4/1989 | Cornette et al. | 521/32 |
| 4,839,003 A * | 6/1989 | Dworak et al. | 205/536 |
| 4,874,529 A * | 10/1989 | Featherstone et al. | 210/713 |
| 4,950,552 A * | 8/1990 | Amend et al. | 428/626 |
| 4,978,457 A * | 12/1990 | Gallup et al. | 210/747 |
| 5,034,127 A * | 7/1991 | Yagishita et al. | 210/337 |
| 5,061,373 A * | 10/1991 | Gallup | 210/697 |
| 5,132,025 A * | 7/1992 | Hays | 210/758 |
| 5,215,632 A * | 6/1993 | Fritts et al. | 205/503 |
| 5,221,528 A * | 6/1993 | Jongema | 423/499.1 |
| 5,262,134 A * | 11/1993 | Frint et al. | 423/184 |
| 5,283,054 A * | 2/1994 | Copenhafer et al. | 423/206.2 |
| 5,290,454 A | 3/1994 | Dorica | |
| 5,352,362 A * | 10/1994 | Mizutani et al. | 210/650 |
| 5,482,696 A * | 1/1996 | Honigschmid-Grossich et al. | 423/552 |
| 5,587,083 A * | 12/1996 | Twardowski | 210/652 |
| 5,632,153 A * | 5/1997 | Ricklefs et al. | 62/85 |
| 5,681,446 A * | 10/1997 | Betts et al. | 205/503 |
| 5,858,216 A * | 1/1999 | Wigen | 210/90 |
| 5,858,240 A * | 1/1999 | Twardowski et al. | 210/652 |
| 5,874,008 A * | 2/1999 | Hirs | 210/708 |
| 5,972,216 A * | 10/1999 | Acernese et al. | 210/253 |
| 6,017,450 A * | 1/2000 | Eisinga | 210/224 |
| 2002/0054841 A1* | 5/2002 | Nakashima et al. | 423/179 |
| 2004/0047781 A1* | 3/2004 | Becenel | 423/46 |
| 2005/0040117 A1* | 2/2005 | Pfeiffer | 210/778 |
| 2005/0161376 A1* | 7/2005 | Heidbreder et al. | 210/90 |

\* cited by examiner

METHOD FOR CONTINUOUSLY FILTERING RAW BRINE FOR USE IN CHLOR-ALKALI ELECTROLYSIS

BACKGROUND OF THE INVENTION

The invention relates to a method for continuously filtering raw brine for use in chlor-alkali electrolysis by means of a backwashing pressure filter.

During conversion to membrane cell technology in chlor-alkali electrolysis the demands on the brine qualities have increased considerably. In order to protect downstream plant components and electrolysis cells, inter alia solid, suspended impurities have to be removed down to a very low level. This solid/liquid separating task is frequently carried out nowadays by multi-stage and correspondingly expensive separating methods, high demands being placed on the reliability primarily in the last separating stage.

Owing to the high investment and operating costs for such plant, alternative concepts which allow method simplification are becoming increasingly important. In addition, the fact plays a part that many installations are conversion operations replacing available obsolete electrolyses by the more efficient and environmentally friendly membrane plant. In these cases an extensive use of available separating apparatus is aimed for. The local conditions, such as infrastructure, space limitations; etc. also have to be considered here. The shutdown or disassembly of available separating apparatus (primarily large-volume thickeners) is often also not desirable at all or is-connected with very high expenditure.

Raw brine contains insoluble suspended solids originating from dissolving basins or precipitation reactions. Typical components of raw brine are barium sulphate, calcium sulphate, calcium carbonate, metal hydroxides and gangue. The concentration and composition of the impurities depends primarily on the salt source and can vary sharply depending on location. Typical concentrations for brines made of rock salt of European origin are in the region of 300 to 1,500 ppm suspended solids.

Owing to the decanting primarily fine particles or small agglomerates arrive in the overflow while primarily larger particles or agglomerates are to be found in the underflow. For this reason the direct filtration of the overflow is difficult on backwashing pressure filters or is sometimes even impossible. The fine particles quickly tend to form a thin and impermeable layer on the filter medium. An immediate increase in pressure and low filtration rates result. In addition it is difficult to remove the particle layer and this leads to a sharply limited backwashing capacity (capacity to regenerate) of the filter medium.

A method for purifying a backwashing pressure filter is known from U.S. Pat. No. 4,443,346 of the type which is suitable, for example, for use in the method according to the invention.

U.S. Pat. No. 3,497,452 describes a method using auxiliary filtering means, some of the filtrate being reprocessed for further filtration, in the removal of solids from solvents in the chemical industry.

Although the formation and removal of a filter cake is described in known methods, it is not described how or in what form the auxiliary filtering means is used. As is known, substances extraneous to the process of mineral (for example perlite, diatomite) or organic (for example cellulose) origin are added as auxiliary filtering means in suspended form to the prefilt prior to the filter. The drawback is that in known applications new auxiliary filtering means have to be added and accumulate as an additional residue during disposal.

SUMMARY OF THE INVENTION

It is the object of the invention to provide an improved method for filtering brines in chlor-alkali chemistry, a stream of material accumulating during the process itself being used as the filtering aid.

It is the object of the invention to provide an improved fully-automatic method for filtering brine that is suitable for chlor-alkali electrolysis.

This object is achieved according to the invention in that, in a first stage, the raw brine is separated into a partial flux with a low solids content as clear brine and a partial flux with a high solids content via a decanter, and in a second stage, some of the partial flux of the clear brine, which has a high solids content, is added to the pressure filter as an auxiliary filtering means.

During filtration, the coarser particles of the partial flux with a high solids content forms a porous and highly permeable filter cake. Problematical fine particles are intercalated and reliably retained. The coarse grain of the partial flux with a high solid content is thus assigned the function of an auxiliary filtering means. This results in a slow pressure increase and high filtration rates. The particle layer reaches a thickness of about 1 to 2 mm and can be easily removed and this leads to a good backwashing capacity (capacity to regenerate) of the filter medium. High solids retention is ensured by the use of suitable, fine-pore filter media.

The dosage of the partial flux with a high solids content is a substantially freely selectable parameter and increases the flexibility of the filtration with respect to variations in the solids composition.

Because the clear brine to be filtered has a partial flux of the decanter underflow added prior to entry into the pressure filter, there is a displacement of the particle size distribution into the coarser range. The displacement of the particle size distribution in cooperation with backwashing pressure filters offers substantial technical and economical advantages:

Increase in the filtration output, i.e. saving in filter area
Improved separation of the solids from the filter medium
Reduced risk of clogging of the filter medium
Insensitivity to varying solids composition
Increased flexibility and reliability of the filtration stage.

BRIEF DESCRIPTION OF THE DRAWING

The objects, features and advantages of the invention will now be illustrated in more detail with the aid of the following description of the preferred embodiment, with reference to the accompanying single FIG. 1.

DETAILED DESCRIPTION OF THE INVENTION

Figure 1:
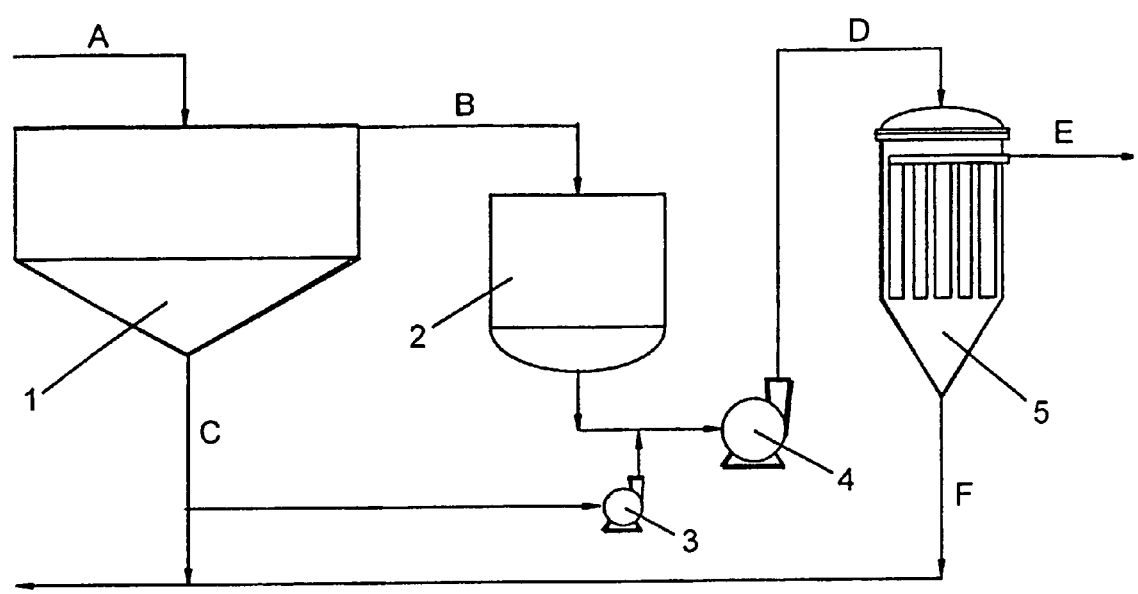

In FIG. 1 a container with raw brine A to be purified is designated by the reference numeral 1. The container 1 is connected via a line containing a clear brine B as overflow and connected to a second container 2. Leading from a lower part of the container 1 is the line containing slurry C with a high solids content leading partially to a disposal site, not shown. The other part of the slurry with a high solids content leads to a metering pump 3. The lower part of the container 2 is connected to a pump 4 via a line. The pressure line of the pump 4 contains a mixed brine D and leads to a backwashing pressure filter 5 with a line E for the pure brine and a line F for the elutriation.

During operation the raw brine A is initially subjected in the container 1 to a preliminary clarification, thickeners, so-called static decanters, generally being used. Owing to the large buffer volume (frequently several thousand cubic meters) and the long dwell time resulting therefrom, these decanters contribute to the operating safety of electrolysis plants. To improve the sedimentation properties of the solids a flocculation aid (for example polyelectrolyte) is generally added to the raw brine.

The raw brine A is separated in the container 1 into a raw brine B with a low solids content and an underflow C with a high solids content. The clear brine B typically also contains solids in the range of 30 to 100 ppm. Some of the underflow C with a high solids content is added to the clear brine B and thus generates a mixed brine D which is fed to the filter 5 via the pump 4. The addition of the underflow may take place at various points, either on the suction or pressure side of the pump 4 or also into the container 2 if a mixing device is available.

The pressure filter 5 generates a virtually solid-free filtrate E, the required discharge values generally being fallen below without further post-treatment (0.5 to 1 ppm). The retained solids are intermittently discharged as thickened slurry F and fed together with the underflow of the thickener, for example to a downstream dehydration process.

The invention will now be described in more detail with the aid of an embodiment and a comparison example. In both cases treatment of 100 m$^3$/h raw brine with a solids content of 1,000 ppm is assumed.

EMBODIMENT 1

| | Brine flux | | | | | |
|---|---|---|---|---|---|---|
| | Raw brine | Clear brine | Thick slurry | Mixed brine | Pure brine | Elutriation |
| Designation | A | B | C | D | E | F |
| Concentration (ppm) | 1000 | 50 | 150000 | 250 | 0.5 | 150000 |
| Ratio of the solids concentration | | (flux D/B) | | | 5 | |
| Specific filter output pressure filter 5 | | (l/m2 × h) | | | 1000 | |
| Required filter area pressure filter 5 | | (m2) | | | 100 | |

Result:

After the start of operation with feeding, a permanent increase in the filtration output by the factor 5 to 6 could be found. The decanter underflow was added in the process in different ratios. Stable and reliable operations could be observed at ratios of 5 to 10:1, based on the solids loading, i.e. the solids concentration in the inlet D to the filter 5 was 5 to 10 times higher than that of the clear brine B. The filtrate quality was clearly below 1 ppm, a value of 0.5 ppm was mainly achieved.

COMPARISON EXAMPLE (WITHOUT FEEDING OF DECANTER UNDERFLOW)

| | Brine flux | | | | | |
|---|---|---|---|---|---|---|
| | Raw brine | Clear brine | Thick slurry | Mixed brine | Pure brine | Elutriation |
| Designation | A | B | C | — | E | F |
| Concentration (ppm) | 1000 | 50 | 150000 | — | 0.5 | 150000 |
| Ratio of the solids concentration | | (flux D/B) | | | — | |
| Specific filter output pressure filter 5 | | (l/m2 × h) | | | 200 | |
| Required filter area pressure filter 5 | | (m2) | | | 500 | |

Result:

It has been found that owing to the low output, filtration is impossible from the point of view of economy. A clear tendency to clog was also established, which was shown by continuously decreasing filtration output.

The invention claimed is:

1. A method of continuously processing raw brine with a solids content to obtain a substantially solids-free pure brine (E) for use in chlor-alkali electrolysis, said method comprising the steps of:
    a) supplying the raw brine (A) with the solids content to a decanter (1);
    b) separating the raw brine (A) into a clear brine (B) with a lower solids content than said solids content of the raw brine and an underflow (C) with a higher solids content than said solids content of the raw brine by means of the decanter (1);
    c) supplying a metered fraction of the underflow (C) with the higher solids content as a filtering aid and all of the clear brine (B) to a pressure filter;
    d) during the supplying of step c), controlling the metered fraction and the clear brine (B) during the supplying so that a solids concentration at an inlet to said pressure filter is 5 to 10 times that of a solids concentration in said clear brine (B); and
    e) filtering with the pressure filter to obtain the substantially solids-free pure brine (E) for chlor-alkali electrolysis and a thickened slurry (F);
    whereby clogging of the pressure filter is reduced and increased output of said pure brine (E) is possible.

2. The method as defined in claim 1, wherein said pressure filter is a backwashing pressure filter (5).

3. The method as defined in claim 1, further comprising adding thickeners to the raw brine in the decanter (1) in order to perform a preliminary clarification.

4. The method as defined in claim 1, wherein said lower solids content of said clear brine (B) is in a range from 30 to 100 ppm and said pure brine (E) contains less than or equal to 1 ppm of retained solids.

5. A method of continuously processing raw brine with a solids content to obtain a substantially solids-free pure brine (E) for chlor-alkali electrolysis, said method comprising the steps of:
    a) supplying a raw brine (A) with a solids content of from about 300 to 1,500 ppm to a decanter (1);
    b) separating the raw brine (A) into a clear brine (B) with a lower solids content in a range from 30 to 100 ppm, said lower solids content being less than the solids content of said raw brine (A), and an underflow (C) with a higher solids content than said solids content of the raw brine by means of the decanter (1);
    c) supplying a metered fraction of the underflow (C) with the higher solids content as a filtering aid and all of the clear brine (B) to a pressure filter;
    d) during the supplying of step c), controlling the metered fraction and the clear brine (B) during the supplying so that a solids concentration at an inlet to said pressure filter is 5 to 10 times that of a solids concentration in said clear brine (B); and
    e) filtering with the pressure filter to obtain the substantially solids-free pure brine (E) containing less than or equal to 1 ppm of retained solids and a thickened slurry (F);
    whereby clogging of the pressure filter is reduced and increased output of said pure brine (E) is possible while maintaining the retained solids in the pure brine (E) at a level of less than or equal to 1 ppm.

* * * * *